March 8, 1955     H. A. BOTTENHORN     2,703,614
ROTARY SHEAR WITH PIVOTED FRAME
Filed Oct. 11, 1952
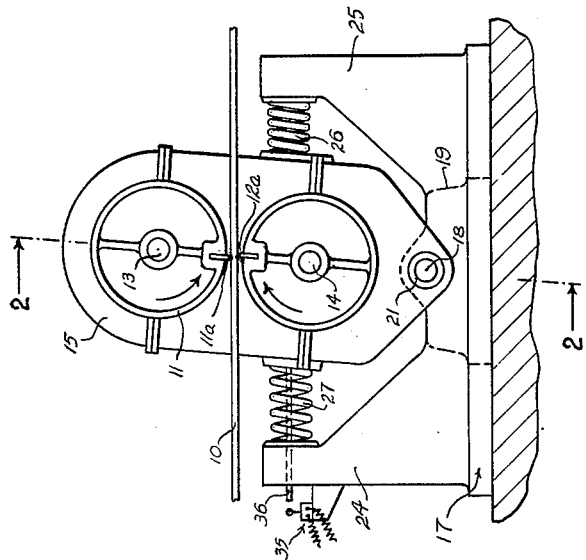
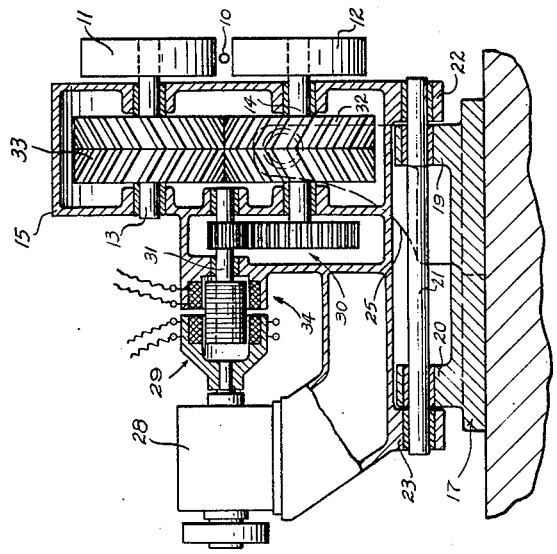
INVENTOR.
HERMANN A. BOTTENHORN
BY
*Pollard and Johnston*

United States Patent Office 2,703,614
Patented Mar. 8, 1955

2,703,614

ROTARY SHEAR WITH PIVOTED FRAME

Hermann A. Bottenhorn, Little Neck, N. Y., assignor to Hydropress, Incorporated, New York, N. Y., a corporation of Delaware Application October 11, 1952, Serial No. 314,260

5 Claims. (Cl. 164—66)

This invention relates to shearing apparatus for cutting continuous materials, such as rods, strips and bars, and more particularly to swingable rotary shearing apparatus of the type used in cutting such materials when they are in motion.

Generally, rotary shears are driven at rotational speeds which are very close to the speeds of the material moving between the cutters so that the linear speed of the cutter, as the cutter enters the material, approaches the linear speed of the material. However, there is always a slight difference between the two speeds and such a difference either causes a ramming of the cutter or a pulling of the material. It has been the prior practice in order to avoid ramming to rotate the shears at a higher speed than the speed of the material to be cut, but this has caused a pulling of the material by the cutters which results in subjecting the shears to a certain recoil each time a cut is made, which, after a relatively short period of service, has a deleterious effect on the cutters resulting in premature destruction of the shears.

It is an object of the invention to provide a rotary shearing apparatus which permits the shear properly to move with the material during shearing.

By the invention, the shears are so moved relative to the moving material that the speed of the cutters at the moment of cutting is adapted to substantially correspond to the speed of the material.

In one aspect of the invention, rotary cutting shears are supported in a housing which is pivotally mounted to swing about a fixed axis on a frame, the housing being continuously biased to a position central of the supporting frame or to a normal upright position. By such construction, the housing is yieldingly moved during cutting by the force of the moving material on the cutting tips when the rotational speed of the tips of the cutters differs from the linear speed of the moving material so that the linear speed of the tips of the cutters is adapted to conform with the linear speed of the material. After the material has been cut and the cutters are free of the material, the housing is biased so that it returns to its normal position. This resilient characteristic of the housing overcomes troublesome recoiling and prolongs the useful life of the cutters.

Other objects, features and advantages of the invention will become apparent from the following detailed description and the accompanying drawings showing an illustrative embodiment of the invention.

In the drawings:

Figure 1 is a front elevation of a rotary shearing apparatus; and

Figure 2 is a vertical section taken along line 2—2 of Figure 1, showing the shearing apparatus partly in elevation and partly in section.

Referring to the drawings, a continuous material, hereinafter referred to as the stock, is indicated at 10. The stock is supported on rollers (not shown) or otherwise, and is driven in a rectilinear path between a pair of oppositely rotatable drums 11 and 12 having cutters 11a and 12a. The drums are fixed on parallel shafts 13 and 14 which are carried on a housing 15. Each shaft is supported for rotation in bearings (not shown) mounted in opposite side walls of the housing.

The housing 15 is pivotally mounted on a frame 17 for swinging movement about a stationary axis 18. The frame 17 has a pair of uprights 19 and 20 at opposite ends thereof which support a longitudinally extending pin 21. Housing 15 has bored lugs 22 and 23 which project from the lower surface thereof, and are pivotally supported on pin 21. Stationary walls 24 and 25 project vertically upwardly from frame 17 on opposite sides of the housing and support horizontally extending springs 26 and 27 which normally urge the housing to an upright position, but which yieldingly permit movement of the housing about axis 18 when the force exerted on the housing by the moving strip material acting against the cutter tips upsets the balance of the spring forces. The tension of the springs may be adjusted so as to control the degree of swinging of the housing.

The housing 15 also carries the cutter actuating elements which may include a continuously operated motor 28, a magnetic clutch 29, and speed reduction gear transmission indicated generally at 30. The latter connects the drum shaft 14 to clutch shaft 31 which is selectively coupled to motor 28 by energization of the magnetic clutch 29. Drum shaft 14 is in turn interconnected with drum shaft 13 by herringbone gears 32 and 33. A magnetic brake 34 is provided to arrest movement of the clutch shaft 31 when the clutch shaft and motor shaft are uncoupled. The magnetic clutch may be deenergized and the magnetic brake may be energized simultaneously by a terminal switch 35 having a plunger 36 which is actuated by housing 15 as it is displaced to the left in Figure 1 under the force of spring 26 after a cut has been taken.

In operation, as the stock to be cut is moved between the drums 11 and 12, the motor 28 can be operated continuously with the cutters at rest because the clutch 29 is not energized. Cutting of the stock is effected by energization of the magnetic clutch 29 which couples the motor to drum shafts 13 and 14 so as to rotate drums 11 and 12. Cutters 11a and 12a are rotated therewith and are accelerated to a predetermined rotational speed such that the linear speed of each cutter as it enters the stock slightly differs from that of the linear speed of the stock so as to prevent ramming of the stock against the cutters. However, as soon as the cutters contact the moving material, the material exerts a force on the tips of the cutters and causes the housing to swing about its pivotal axis 18. By such movement the linear speed of the cutting tips relative to the moving material and the linear speed of the moving material become substantially the same. After the cut is made and the cutters are moved out of contact with the stock, springs 26 and 27 act on the housing to return it to its normal upright position. This control of housing movement overcomes the recoil which is produced when the material is pulled by rotating cutters supported on stationary housings. Concurrently therewith, the displacement of the housing by the springs actuates plunger 36 so as to operate switch 35, thereby deenergizing magnetic clutch 29 through suitable control relays (not shown) to uncouple motor 28 and drum shafts 13 and 14, and to energize magnetic brake 34 to arrest rotational movement of the cutters.

It is to be understood that the detailed description and the accompanying drawings are illustrative and that the invention herein disclosed may be embodied in various forms of construction within the scope of the appended claims, as will be apparent to those skilled in the art.

What is claimed is:

1. In a shearing apparatus, the combination including a fixed pivot pin, a housing swiveled on said pin, a pair of cooperating rotatable cutting elements mounted on said housing for rotation about fixed axes parallel to said pin and to each other, work being passable between said cutting elements for shearing thereby upon rotation of the cutting elements, the axis of the pivot pin being disposed on one side of the path of travel of the work through the cutting elements so that the housing will swing about its pivot under force applied by the work to the cutting elements and both cutting elements will move together in the direction of travel of and at substantially the same linear speed as the work, and resilient means normally holding said housing in a position wherein the plane passing through the axes of rotation of the cutting elements is at a predetermined angle to the path of the work but yielding as material is sheared to permit movement of the housing about said pivot pin.

2. In a shearing apparatus for cutting moving strip material, the combination comprising a fixed pivot pin, a housing swiveled on said pin and carrying a pair of spaced drums oppositely rotatable about axes parallel to the pivot pin and to each other, said drums defining an opening therebetween through which a strip to be cut is moved, each of said drums having a shear blade extending into the opening as the drum rotates to operatively cooperate with a blade of the other drum in shearing a strip passed through the opening, the axis of the pivot pin being offset from the path of travel of the strip through the blades so that the housing will swing about its pivot under force applied by the strip material to the blades and both drums will move together in the direction of travel of and at substantially the same linear speed as the strip, and resilient means normally holding the housing in a position wherein the plane passing through the axis of rotation of the drums is at a predetermined angle to the path of the strip, yet yieldingly permitting such movement of the housing about said pivot pin.

3. In a shearing apparatus for cutting moving strip material, the combination comprising a fixed frame having a horizontal base and vertical side walls, a pivot pin extending longitudinally and horizontally in fixed position on said base between said side walls, a housing swiveled on said pin for movement between said side walls and carrying a pair of spaced drums oppositely rotatable about axes parallel to the pivot pin and to each other, said drums defining an opening therebetween through which a strip to be cut is moved, each of said drums having a shear blade extending into the opening as the drum rotates to operatively cooperate with a blade of the other drum in shearing a strip passed through the opening, the axis of the pivot pin being disposed on one side of the path of travel of the strip through the blades so that the housing will swing about its pivot under force applied by the strip material to the blades and both drums will move together in the direction of travel of and at substantially the same linear speed as the strip, and spring means interposed between opposite sides of the housing and opposing parts of said vertical side walls, the axis of the pivot pin being disposed below the lines of force of said spring means so that the spring means normally hold the housing in a vertical position yet yieldingly permit movement of the housing about the pivot pin away from its normal position.

4. In a shearing apparatus for cutting moving strip material, the combination comprising a fixed pivot pin, a housing swiveled on said pin and carrying a pair of spaced drums rotatable about axes parallel to the pivot pin and to each other, said drums defining an opening therebetween through which a strip to be cut is moved, power-operated means for rotating said drums in opposite directions, each of said drums having a shear blade extending into the opening as the drum rotates to operatively cooperate with a blade on the other drum in shearing a strip passed through the opening, the axis of the pivot pin being disposed on one side of the path of travel of the strip through the blades so that the housing will swing about its pivot under force applied by the strip material to the blades and both drums will move together in the direction of travel of and at substantially the same linear speed as the strip, resilient means normally holding the housing in a position wherein the plane passing through the axis of rotation is at a predetermined angle to the path of the strip, yet yieldingly permitting movement of the housing about said pivot pin, said power operated means including a drive shaft in driving relation with said drums, a continuously driven motor shaft, clutch means operable to clutch said drive shaft with the motor shaft for rotating the drums, and means responsive to a predetermined displacement of the housing from its normal position for uncoupling the motor shaft and the drive shaft.

5. In a shearing apparatus for cutting moving strip material, the combination comprising a fixed frame having a horizontal base and upright side walls, a pivot pin extending longitudinally and horizontally in fixed position on said base between said side walls, a housing swiveled on said pin for movement between said side walls and carrying a pair of spaced drums rotatable about axes parallel to the pivot pin and to each other, said drums defining an opening therebetween through which a strip to be cut is moved, power operated means for rotating said drums in opposite directions, each of said drums having a shear blade extending into the opening as the drum rotates to operatively cooperate with a blade on the other drum in shearing a strip passed through the opening, the axis of the pivot pin being aligned with the axes of rotation of the drums and being disposed on one side of the path of travel of the strip through the blades so that the housing will swing about its pivot under the force applied by the strip material to the blades and both drums will move together in the direction of travel of and at substantially the same linear speed as the strip, spring means interposed between the upright walls and opposing lateral parts of the housing, the axis of the pivot pin being disposed below the lines of force of said spring means so that the spring means normally hold the housing in a vertical position but yieldingly permit movement of the housing about said pivot away from its normal position, said power operated means including a drive shaft in driving relation with said drums, an electromagnetic clutch to couple said drive shaft with the motor shaft for rotating the drums, electro-magnetic brake means operable to restrain rotary movement of the drive shaft in the drums, and means actuated by a predetermined displacement of the housing from its normal position for deenergizing the electro-magnetic clutch to uncouple the drive shaft from the motor shaft and for energizing the electro-magnetic brake means to restrain rotational movement of the drive shaft after each cut has been made.

References Cited in the file of this patent

UNITED STATES PATENTS

| | | |
|---|---|---|
| 2,410,555 | Stevens | Nov. 5, 1946 |
| 2,548,427 | Fernbach | Apr. 10, 1951 |

FOREIGN PATENTS

| | | |
|---|---|---|
| 511,831 | Great Britain | Aug. 24, 1939 |